US012757301B2

(12) United States Patent
Lai

(10) Patent No.: US 12,757,301 B2
(45) Date of Patent: Oct. 6, 2026

(54) LED DRIVING CIRCUIT

(71) Applicant: Silergy Semiconductor Technology (Hangzhou) LTD, Hangzhou (CN)

(72) Inventor: Hongbin Lai, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 112 days.

(21) Appl. No.: 18/732,925

(22) Filed: Jun. 4, 2024

(65) Prior Publication Data

US 2024/0414817 A1 Dec. 12, 2024

(30) Foreign Application Priority Data

Jun. 9, 2023 (CN) ......................... 202310684241.1

(51) Int. Cl.
*H05B 45/10* (2020.01)
*H05B 45/44* (2020.01)

(52) U.S. Cl.
CPC ............. *H05B 45/10* (2020.01); *H05B 45/44* (2020.01)

(58) Field of Classification Search
CPC ...... H05B 45/10; H05B 45/44; H05B 45/375; H05B 45/30; H05B 45/325; H05B 45/34; H05B 45/345; H05B 45/3725
See application file for complete search history.

(56) References Cited

U.S. PATENT DOCUMENTS 6,005,780 A 12/1999 Hua
6,580,258 B2 6/2003 Wilcox et al.
9,325,254 B2 4/2016 Deng et al.
9,331,588 B2 5/2016 Chen
9,488,680 B2 11/2016 Xu
2014/0078789 A1 3/2014 Li et al.
2014/0239934 A1 8/2014 Zhang
2014/0347895 A1* 11/2014 Tadamasa ......... H02M 3/33507 363/21.16
2015/0054414 A1* 2/2015 Kamata .............. H05B 45/3725 315/158
2015/0160270 A1 6/2015 Shi et al.
2015/0280578 A1 10/2015 Huang et al.
2016/0020699 A1 1/2016 Shen et al.
2018/0084619 A1* 3/2018 Wang ................... H05B 45/395
2020/0091826 A1 3/2020 Yang et al.
2020/0128635 A1* 4/2020 Wang ..................... H05B 45/44
2020/0205265 A1* 6/2020 Wang ..................... H05B 45/36

FOREIGN PATENT DOCUMENTS

CN 103220864 A 7/2013
CN 108184280 A 11/2017
CN 108809107 B 11/2018
CN 112533326 A 3/2021

* cited by examiner

*Primary Examiner* — Minh Tran

(57) ABSTRACT

An LED driving circuit can include: an electrolytic capacitor coupled between two outputs of a rectifier circuit; an auxiliary power supply circuit coupled in parallel with the electrolytic capacitor, and being configured to convert a voltage of the electrolytic capacitor into a power supply voltage to at least power a dimming control circuit, where the dimming control circuit is configured to generate a dimming control signal; and a linear driving circuit configured to control a driving current flowing through an LED load based on the dimming control signal, where the linear driving circuit is coupled in series with the LED load.

14 Claims, 6 Drawing Sheets

LED DRIVING CIRCUIT

RELATED APPLICATIONS

This application claims the benefit of Chinese Patent Application No. 202310684241.1, filed on Jun. 9, 2023, which is incorporated herein by reference in its entirety.

FIELD OF THE INVENTION

The present invention generally relates to the field of power electronics, and more particularly to LED driving circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
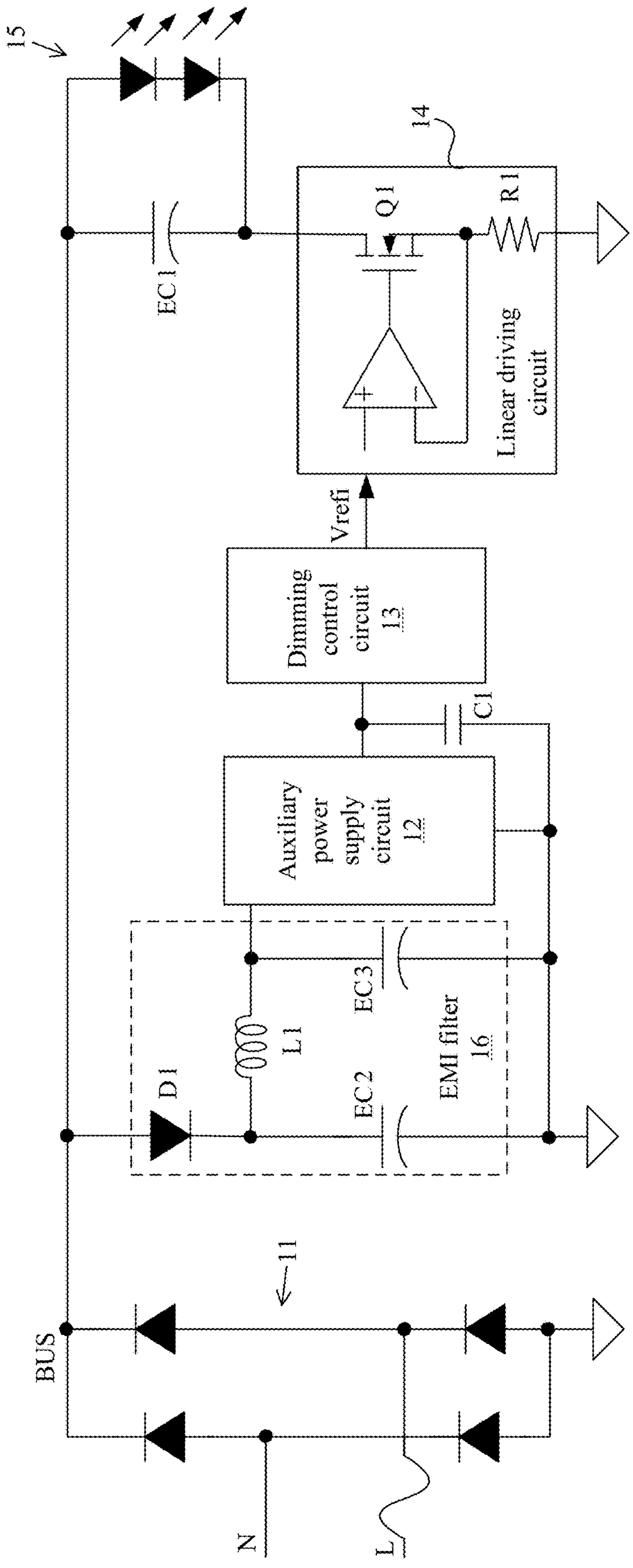
FIG. 1 is a schematic block diagram of an example LED driving circuit.

Referring now to FIG. 1, shown is a schematic block diagram of an example light-emitting diode (LED) driving circuit. LED lighting finds widespread application in various fields, such as furniture, offices, outdoor lighting, and stage illumination. Dimming technology allows for adjustable brightness of LED loads, thereby enhancing the practical applications and user experience of LED lighting. In typical dimmable LED driving circuits, rectifier circuit 11, auxiliary power supply circuit 12, dimming control circuit 13, and linear driving circuit 14 can be included.

Rectifier circuit 11 can convert alternate currents (AC) into direct currents (DC), which may then be output to a DC bus. Linear driving circuit 14 can connect in series with LED load 15. By controlling transistor Q1 to operate in the linear state, a current flowing through LED load 15 is constant and controllable. Electrolytic capacitor EC1 can connect in parallel with LED load 15 and in series with linear driving circuit 14. Dimming control circuit 13 can generate dimming control signal Vrefi based on a dimming signal. Based on dimming control signal Vrefi, linear driving circuit 14 can generate a driving current for LED load 15. Dimming control circuit 13 can be powered by auxiliary power supply circuit 12 (e.g., a switch-mode power converter). Due to the high switching frequency of the auxiliary power supply circuit 12, an electromagnetic interference (EMI) filter 16 may be utilized for filtering. The EMI filter can include diode D1, inductor L1, and capacitors EC2 and EC3. However, this approach can increase system costs and the number of components, which is not ideal for most highly integrated designs.

Figure 2:
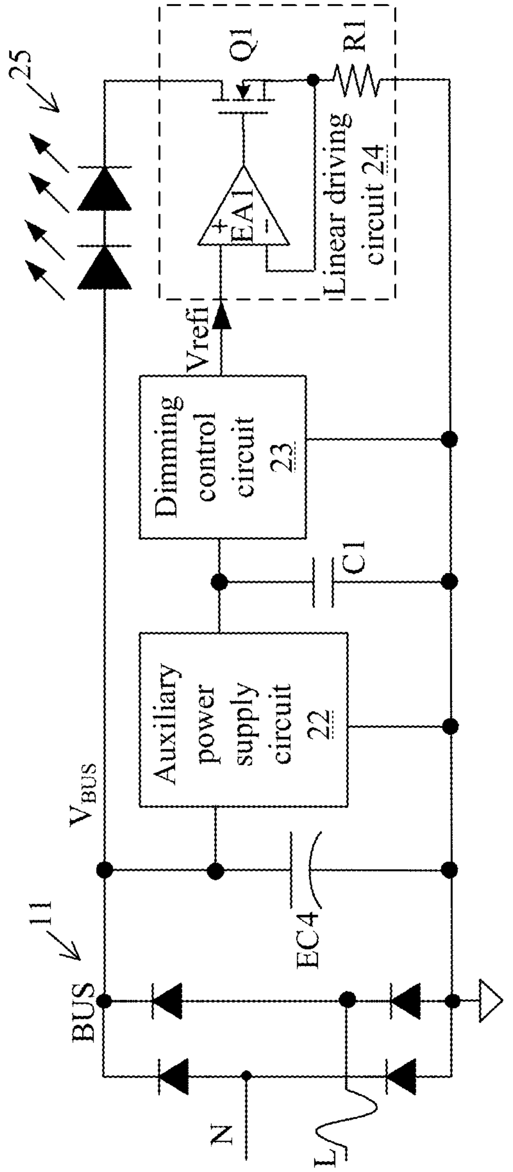
FIG. 2 is a schematic block diagram of a first example LED driving circuit, in accordance with embodiments of the present invention.

Referring now to FIG. 2, shown is a schematic block diagram of a first example LED driving circuit, in accordance with embodiments of the present invention. In this particular example, the LED driving circuit can include rectifier circuit 11, auxiliary power supply circuit 22, dimming control circuit 23, linear driving circuit 24, and electrolytic capacitor EC4. Rectifier circuit 11 can convert an AC into a DC, which may then be output to a DC bus. A first terminal of electrolytic capacitor EC4 can connect to a first output of rectifier circuit 11, and a second terminal of electrolytic capacitor EC4 can connect to a common node of a second output of rectifier circuit 11 and a ground terminal. LED load 25 can connect in series with linear driving circuit 24, and then can connect in parallel with electrolytic capacitor EC4. LED load 25 can connect to an output port of the LED driving circuit.

Auxiliary power supply circuit 22 can connect in parallel with electrolytic capacitor EC4, and a voltage of electrolytic capacitor EC4 (e.g., a voltage difference between the plates of electrolytic capacitor EC4) may be configured as an input voltage of auxiliary power supply circuit 22. Electrolytic capacitor EC5 can be configured as an input capacitor of auxiliary power supply circuit 22, and capacitor C1 configured as an output capacitor of auxiliary power supply circuit 22. Auxiliary power supply circuit 22 can convert the input voltage into a voltage having a value that meets power supply requirements of dimming control circuit 23. This voltage (e.g., 5V, 3.3V, etc.) may serve as a power supply voltage of dimming control circuit 23. Auxiliary power supply circuit 22 (e.g., a switch-mode power converter) can at least power dimming control circuit 23. Auxiliary power supply circuit 22 can also power other control modules of the LED driving circuit, as long as the power supply requirements of that control module are consistent with dimming control circuit 23.

Dimming control circuit 23 can generate dimming control signal Vrefi based on a dimming signal, and a value of dimming control signal Vrefi may correspond to a present desired value of a driving current flowing through LED load 25. Dimming control signal Vrefi can be adjustable, e.g., dimming control signal Vrefi can be a fixed or variable value. For example, the dimming signal can be a pulse-width modulation (PWM) or an analog dimming signal. Linear driving circuit 24 can control the driving current flowing through LED load 25 based on dimming control signal Vrefi output from dimming control circuit 23. Linear driving circuit 24 can control a transistor Q1 to operate in a linear state, such that the driving current flowing through LED load 25 remains constant and controllable.

Linear driving circuit 24 can include transistor Q1, resistor R1, and error amplifier EA1 for controlling transistor Q1. Transistor Q1 can connect between LED load 25 and resistor R1. A first terminal of resistor R1 can connect to a source of transistor Q1, and a second terminal of resistor R1 is grounded. A gate of transistor Q1 can connect to an output of error amplifier EA1. The non-inverting input of error amplifier EA1 may receive dimming control signal Vrefi, and the inverting input of error amplifier EA1 can connect to the source of transistor Q1. Since a current flowing through transistor Q1 can generate a voltage drop across resistor R1, a voltage of the inverting input of error amplifier EA1 may indicate the current flowing through transistor Q1, thereby enabling an output signal of error amplifier EA1 to vary with the driving current, and forming a closed current loop.

The output signal of error amplifier EA1 can control transistor Q1 to operate in the linear state, and can control the current flowing through transistor Q1, such that the current flowing through transistor Q1 is consistent with (e.g., the same as) a reference signal of the driving current of the LED load, e.g., dimming control signal Vrefi. Linear driving circuit 24 can be adjusted as needed, and any circuit capable of achieving the constant current control for the driving current of the LED load can be utilized in certain embodiments. Linear driving circuit 24 can adopt other suitable designs. As an example, the LED load, transistor Q1, and resistor R1 can connect in series in the order listed between a high-potential terminal of electrolytic capacitor EC4 and the ground terminal. As another example, transistor Q1, resistor R1, and the LED load can connect in series in the order listed between the high-potential terminal of electrolytic capacitor EC4 and the ground terminal.

It should be noted that linear driving circuit 24 and dimming control circuit 23 can also be combined into a circuit module. This module can be integrated with various rectifier circuits and silicon-controlled dimmers to create the desired LED driving circuit. The circuit module can be assembled using together discrete components and integrated circuits, or can be one integrated circuit or part of an integrated circuit.

Since transistor Q1 in linear driving circuit 24 operates in the linear state, where no high-frequency switching actions are involved, linear driving circuit 24 itself may not require an electromagnetic interference (EMI) filter. However, auxiliary power supply circuit 22 can be configured as a switch-mode power converter, where the transistor switches on and off rapidly at a high frequency. While this setup necessitates an EMI filter to suppress the resulting high-frequency noise, the LED driving circuit of particular embodiments can connect auxiliary power supply circuit 22 in parallel to electrolytic capacitor EC4 with a larger capacitance, such that auxiliary power supply circuit 22 and LED load 25 may share the same electrolytic capacitor EC4. The larger capacitor can provide better filtering characteristics for high-frequency switching noise, thus eliminating the need for an additional filter specifically for auxiliary power supply circuit 22. As a result, this LED driving circuit design can save on EMI filters, contributing to reduced system volume and associated costs.

In particular embodiments, when an average value of a DC bus voltage VBUS significantly exceeds a load voltage $V_{LED}$ of LED load 25 (e.g., a voltage difference between two terminals of LED load 25), a capacitance of electrolytic capacitor EC4 can be increased to maintain a constant current, resulting in higher power consumption of transistor Q1 in linear driving circuit 24. This may reduce system efficiency some cases, and the large capacitance of electrolytic capacitor EC4 can also lead to a lower power factor (PF) for the system.

Figure 3:
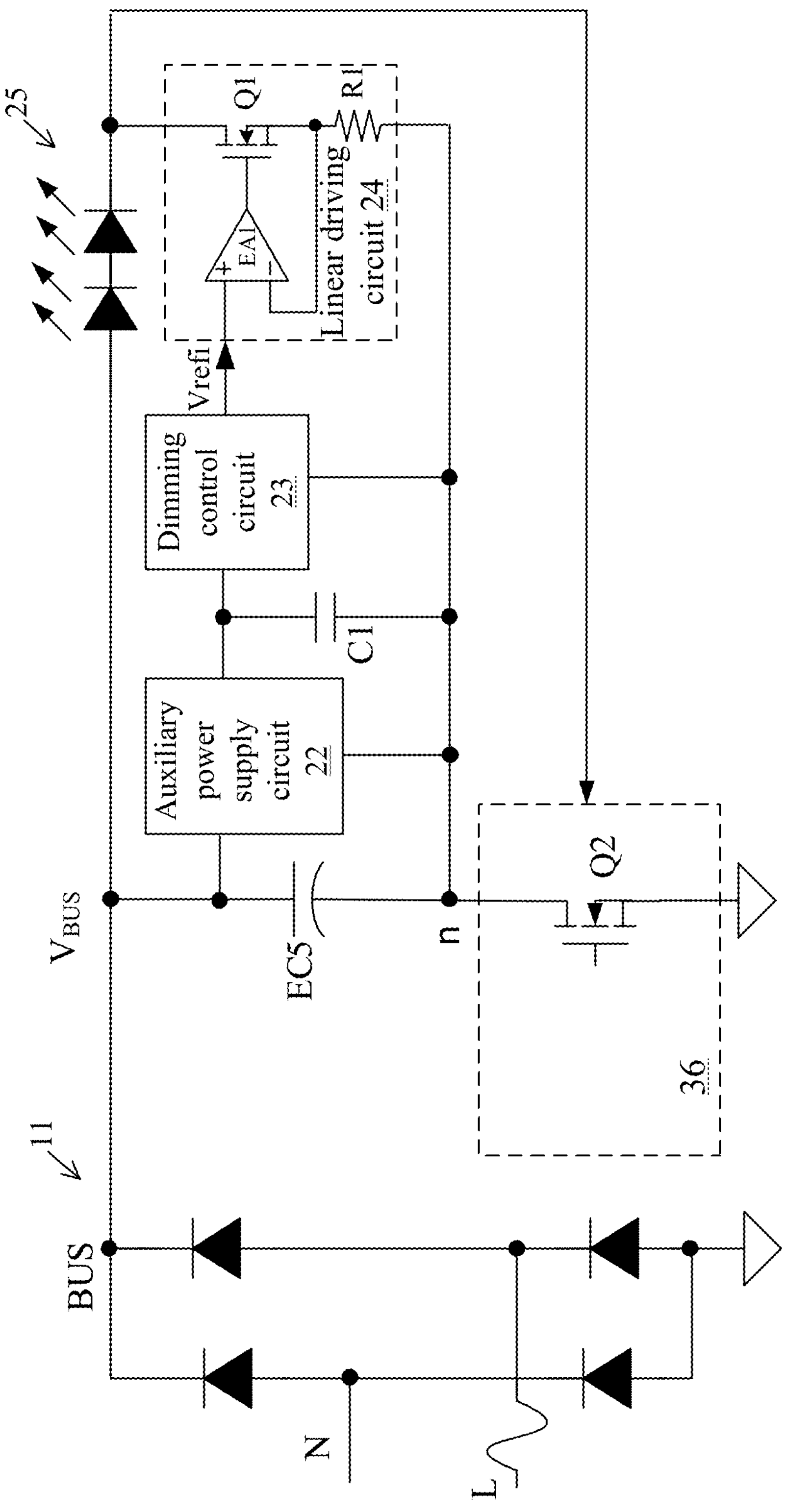
FIG. 3 is a schematic block diagram of a second example LED driving circuit, in accordance with embodiments of the present invention.

Referring now to FIG. 3, shown is a schematic block diagram of a second example LED driving circuit, in accordance with embodiments of the present invention. In this particular example, the LED driving circuit can include electrolytic capacitor EC5 and voltage regulation circuit 36, in addition to rectifier circuit 11, auxiliary power supply circuit 22, dimming control circuit 23, and linear driving circuit 24. For example, voltage regulation circuit 36 can connect in series with electrolytic capacitor EC5 between the two outputs of rectifier circuit 11. For example, electrolytic capacitor EC5 can connect between the first output of rectifier circuit 11 and node n, and voltage regulation circuit 36 can connect between node n and the second output (e.g., the ground terminal) of rectifier circuit 11.

Voltage regulation circuit 36 can control a voltage of electrolytic capacitor EC5 (e.g., a voltage difference between plates of electrolytic capacitor EC5). Further, voltage regulation circuit 36 can control the voltage of electrolytic capacitor EC5 based on a voltage sampling signal indicating a difference between the voltage of electrolytic capacitor EC5 and the load voltage of the LED load. As an example, voltage regulation circuit 36 can control the voltage of electrolytic capacitor EC5 based on a voltage sampling signal indicating a voltage difference between two terminals of linear driving circuit 24, such that the voltage of electrolytic capacitor EC5 closely matches load voltage $V_{LED}$ of LED load 25, thereby reducing the power consumption of linear driving circuit 24 and improving the efficiency of the LED driving circuit.

Voltage regulation circuit 36 can include transistor Q2, which can connect in series with electrolytic capacitor EC5. Voltage regulation circuit 36 can control a charging current or a discharging current of electrolytic capacitor EC5 by adjusting a current flowing through transistor Q2, in order to control the voltage of electrolytic capacitor EC5. Voltage regulation circuit 36 may serve two primary purposes. First, it can minimize the voltage difference between the two terminals of linear driving circuit 24 to reduce overall power consumption. Second, it can control a waveform of the charging current or the discharging current of electrolytic capacitor EC5, in order to improve the PF for the system.

In particular embodiments, voltage regulation circuit 36 can be adjusted as needed, and any circuit module capable of controlling the voltage of electrolytic capacitor EC5 based on the voltage sampling signal (which indicates the voltage difference between the two terminals of linear driving circuit 24), and ensuring that the voltage of electrolytic capacitor EC5 closely matches load voltage $V_{LED}$ of LED load 25, can be utilized. For example, voltage regulation circuit 36 may be a switch-mode power converter connected between rectifier circuit 11 and electrolytic capacitor EC5. In this configuration, an input of the switch-mode power converter can connect to the output of rectifier circuit 11, and an output of the switch-mode power converter can connect to the two terminals of electrolytic capacitor EC5 (e.g., electrolytic capacitor EC5 serves as an output capacitor of the switch-mode power converter).

By sharing a large capacitor between auxiliary power supply circuit 22 and the LED load, the LED driving circuit of particular embodiments has a simple structure without a separate filtering circuit for auxiliary power supply circuit 22. For example, auxiliary power supply circuit 22 can connect in parallel with a constant-voltage output capacitor (e.g., electrolytic capacitor EC5), and the LED load can connect in series with linear driving circuit 24, and then the series connection of the LED load and linear driving circuit 24 can connect in parallel with electrolytic capacitor EC5. Further, the LED driving circuit can adaptively control the voltage of electrolytic capacitor EC5, ensuring it closely matches the load voltage of the LED load, thus minimizing the voltage difference of the linear driving circuit, and allowing the LED driving circuit to operate at a relatively higher or the highest efficiency.

Figure 4:
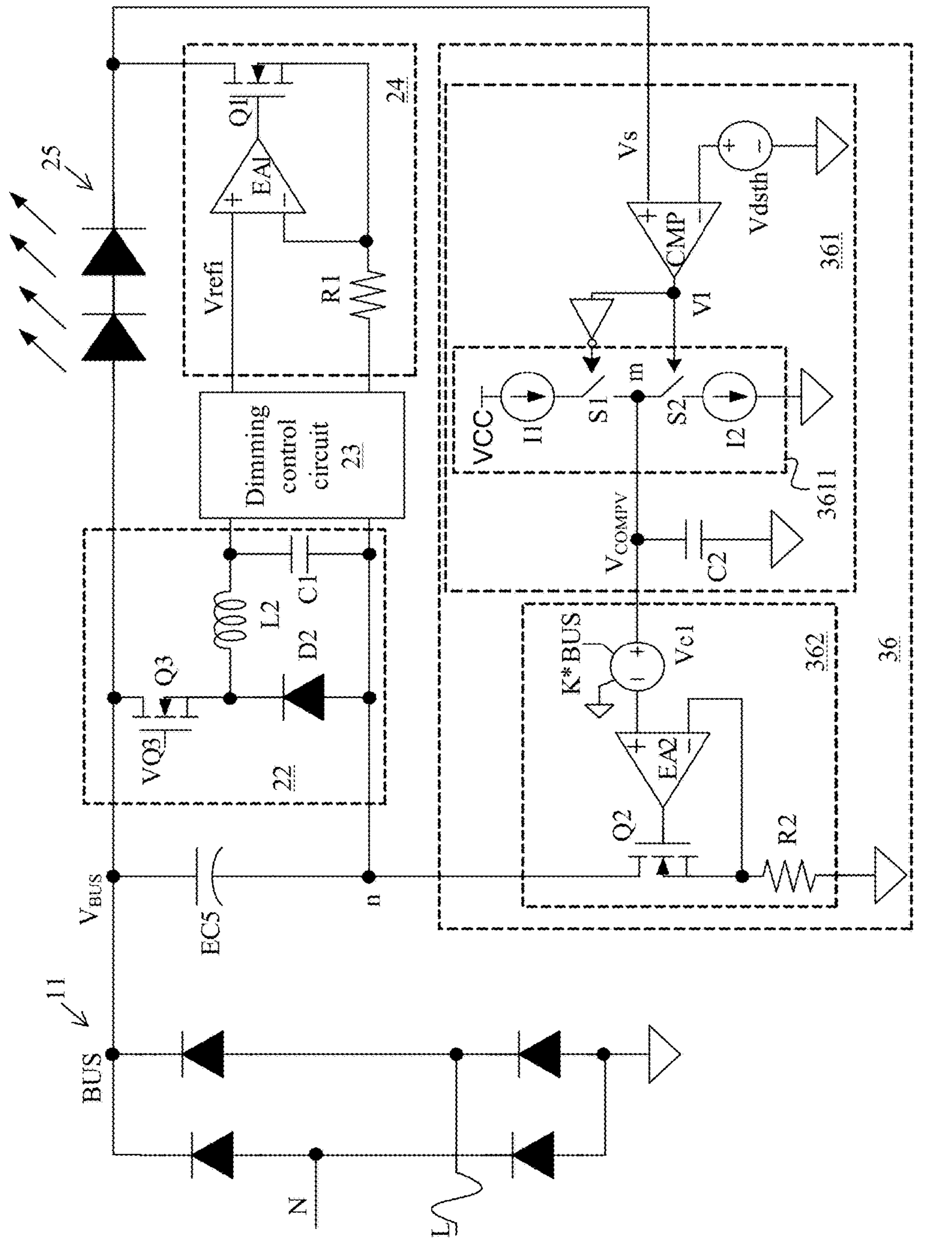
FIG. 4 is a schematic block diagram of further details of the second example LED driving circuit, in accordance with embodiments of the present invention.

Referring now to FIG. 4, shown is a schematic block diagram of further details of the second example LED driving circuit, in accordance with embodiments of the present invention. In this particular example, auxiliary power supply circuit 22 is configured as a switch-mode power converter, and an input of the switch-mode power converter can connect in parallel with electrolytic capacitor EC5. For example, auxiliary power supply circuit 22 is a buck converter, but any suitable types of switch-mode power converters (e.g., buck-boost converters, etc.) can be utilized in certain embodiments. Electrolytic capacitor EC5 can be configured as an input capacitor of auxiliary power supply circuit 22. Auxiliary power supply circuit 22 can include transistor Q3, diode D2, inductor L2, and output capacitor C1. Transistor Q3 and diode D2 can connect in series between the two terminal of electrolytic capacitor EC5 for receiving bus voltage VBUS, and inductor L2 can connect between a common node of transistor Q3 and diode D2 and one terminal of output capacitor C1, while the other terminal of output capacitor C1 may be grounded.

Voltage regulation circuit 36 can control the voltage of electrolytic capacitor EC5 based on the voltage sampling signal indicating the difference between the voltage of electrolytic capacitor EC5 and the load voltage of the LED load. As an example, voltage regulation circuit 36 can control the voltage of electrolytic capacitor EC5 based on the voltage sampling signal indicating the voltage difference between the two terminals of linear driving circuit 24. For example, a voltage of a common terminal of linear driving circuit 24 and the LED load can indicate the voltage difference between the two terminals of linear driving circuit 24. Therefore, voltage regulation circuit 36 can also include a sampling circuit that can perform a single-terminal sampling on the voltage of the common terminal of linear driving circuit 24 and the LED load, in order to generate voltage sampling signal Vs.

For example, voltage regulation circuit 36 can include control signal generation circuit 361 and voltage control circuit 362. Control signal generation circuit 361 can receive voltage sampling signal Vs and threshold voltage Vdsth, in order to obtain control signal $V_{COMPV}$. Voltage control circuit 362 may receive control signal $V_{COMPV}$, and can control the voltage of electrolytic capacitor EC5 based on control signal $V_{COMPV}$. As an example, a variation trend of control signal $V_{COMPV}$ may be opposite to a variation trend of voltage sampling signal Vs, and consistent with a variation trend of the voltage of electrolytic capacitor EC5. It should be noted that any control circuit capable of ensuring that the variation trend of voltage sampling signal Vs is opposite to the variation trend of the voltage of electrolytic capacitor EC5 can be utilized in certain embodiments.

Control signal generation circuit 361 can include comparator CMP, capacitor C2, and charging-discharging circuit 3611. A first input of comparator CMP may receive voltage sampling signal Vs, a second input of comparator CMP may receive threshold voltage Vdsth, and an output of comparator CMP can generate comparison signal V1. A voltage of capacitor C2 (e.g., a potential difference between plates of capacitor C2) can be configured as control signal $V_{COMPV}$. When voltage sampling signal Vs is less than threshold voltage Vdsth, charging-discharging circuit 3611 can charge capacitor C2, and a magnitude of control signal $V_{COMPV}$ may increase. When voltage sampling signal Vs is greater than threshold voltage Vdsth, charging-discharging circuit 3611 can discharge capacitor C2, and the magnitude of control signal $V_{COMPV}$ may decrease.

As an example, charging-discharging circuit 3611 can include constant current source I1, switch S1, constant current source I2, and switch S2. Constant current source I1 and switch S1 can connect in series between a power supply VCC and node m. Constant current source I2 and switch S2 can connect in series between node m and the ground terminal. Capacitor C2 can connect between node m and the ground terminal. A control terminal of switch S2 may receive comparison signal V1, and a control terminal of switch S1 may receive comparison signal V1 through an inverter. That is, an operational state of switch S2 can be controlled by comparison signal V1, and an operational state of switch S1 controlled by an inverted signal of comparison signal V1.

When voltage sampling signal Vs is less than threshold voltage Vdsth, comparison signal V1 can be at a low level, switch S2 can be open, and switch S1 closed, such that constant current source I1 can charge capacitor C2, thus increasing the magnitude of control signal $V_{COMPV}$. When voltage sampling signal Vs is greater than threshold voltage Vdsth, comparison signal V1 can be at a high level, switch S2 can be closed, and switch S1 open, such that constant current source I2 can discharge capacitor C2, thus decreasing the magnitude of control signal $V_{COMPV}$. Charging-discharging circuit 3611 may also adopt other designs in certain embodiments. As an example, voltage control circuit 362 and electrolytic capacitor EC5 can connect in series to the two outputs of rectifier circuit 11, and voltage control circuit 362 can control a current flowing through electrolytic capacitor EC5 based on control signal $V_{COMPV}$, in order to control the voltage of electrolytic capacitor EC5.

For example, voltage control circuit 362 can include transistor Q2, a sampling unit, and error amplifier EA2. The sampling unit can include resistor R2. Transistor Q2 and resistor R2 can connect in series between node n and the ground terminal. A first input of error amplifier EA2 can connect to a first power terminal of a first voltage-controlled voltage source Vc1, a second input of error amplifier EA2 can connect to a common terminal of transistor Q2 and resistor R2, and an output of error amplifier EA2 can connect to a control terminal of transistor Q2. A second power terminal of voltage-controlled voltage source Vc1 may receive control signal $V_{COMPV}$, and a control terminal of voltage-controlled voltage source Vc1 may receive a first reference signal. As an example, the first reference signal can be proportional to bus voltage VBUS, e.g., $K*V_{BUS}$, where K is a scaling factor. Therefore, a voltage at the first power terminal of voltage-controlled voltage source Vc1 is $V_{COMPV}$-K*$V_{BUS}$. As can be seen, a variation trend of the voltage at the first power terminal of voltage-controlled voltage source Vc1 can coincide with the variation trend of control signal $V_{COMPV}$.

Electrolytic capacitor EC5 can connect between a high-potential terminal of the output of rectifier circuit 11 and node n. As an example, transistor Q2 may operate in the linear state. When the magnitude of control signal $V_{COMPV}$ increases, the voltage at the first power terminal of voltage-controlled voltage source Vc1 can increase, and a current flowing through transistor Q2 can increase, such that a charging current of electrolytic capacitor EC5 increases, and the voltage of electrolytic capacitor EC5 increases. When the magnitude of control signal $V_{COMPV}$ decreases, the voltage at the first power terminal of voltage-controlled voltage source Vc1 can decrease, and the current flowing through transistor Q2 can decrease, such that the charging current of electrolytic capacitor EC5 decreases, and the voltage of electrolytic capacitor EC5 decreases.

When voltage sampling signal Vs is less than threshold voltage Vdsth, voltage control circuit 362 can increase the voltage of electrolytic capacitor EC5. At this time, since a value of the load voltage of the LED load is relatively stable, a magnitude of voltage sampling signal Vs can increase. When voltage sampling signal Vs is greater than threshold voltage Vdsth, voltage control circuit 362 can decrease the voltage of electrolytic capacitor EC5. At this time, since the value of the load voltage of the LED load is relatively stable, the magnitude of voltage sampling signal Vs may decrease. Continuously performing the above dynamic adjustment can make voltage sampling signal Vs substantially equal to threshold voltage Vdsth in a steady state (e.g., voltage sampling signal Vs fluctuates within a certain range above and below threshold voltage Vdsth).

When threshold voltage Vdsth has a smaller value, since the potential difference between the two terminals of linear driving circuit 24, which is proportional to voltage sampling signal Vs, is equal to the difference between the voltage of electrolytic capacitor EC5 and the load voltage of the LED load, and voltage sampling signal Vs is substantially equal to threshold voltage Vdsth, the difference between the voltage of electrolytic capacitor EC5 and the load voltage of the LED load can become smaller, resulting in higher efficiency of the LED driving circuit. Those skilled in the art will recognize that the efficiency of the LED driving circuit can be influenced by threshold voltage Vdsth. When configuring the LED load for normal operations and minimizing the current flowing through the LED load, a voltage at a common terminal of the LED load and transistor Q1, or a potential difference between two terminals of transistor Q1, can match threshold voltage Vdsth. At which time, the potential difference between the two terminals of linear driving circuit 24 can be minimized, thus resulting in the lowest power consumption and highest efficiency for the LED driving circuit.

Figure 5:
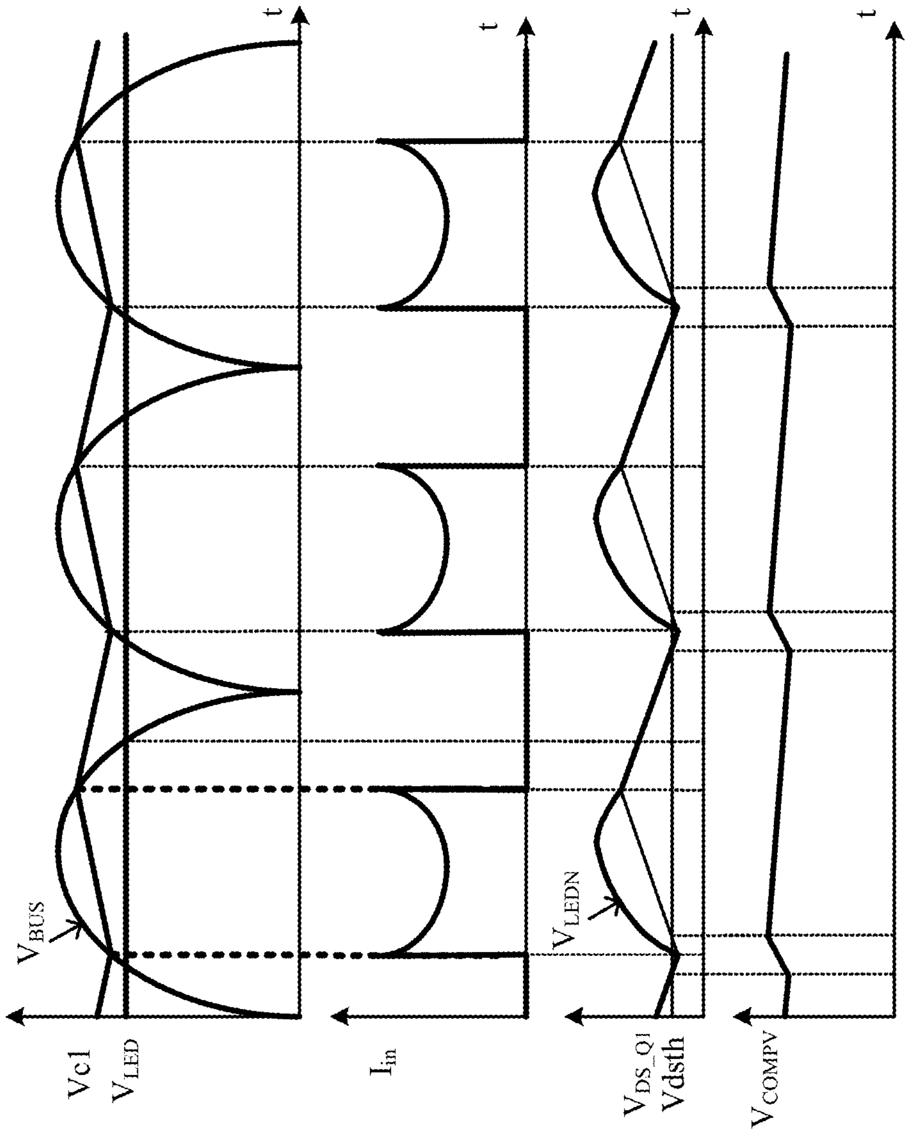
FIG. 5 is a waveform diagram of example operation of the second example LED driving circuit when in a steady state, in accordance with embodiments of the present invention.

Referring now to FIG. 5, shown is a waveform diagram of example operation of the second example LED driving circuit when in a steady state, in accordance with embodiments of the present invention. A voltage at the outputs of rectifier circuit 11 may be represented as $V_{BUS}$, the voltage of electrolytic capacitor EC5 represented as VEC5, the load voltage of the LED load represented as $V_{LED}$, a current at the output of rectifier circuit 11 represented as Iin, the voltage at the common terminal of transistor Q1 and the LED load represented as $V_{LEDN}$, the voltage difference between the two terminals of transistor Q1 represented as VDS_Q1, and the first control signal represented as $V_{COMPV}$. Here, voltage $V_{LEDN}$ at the common terminal of transistor Q1 and the LED load, or voltage difference $V_{DS\_Q1}$ between the two terminals of transistor Q1 may directly serve as voltage sampling signal Vs. As another example, voltage sampling signal Vs can be proportional to voltage $V_{LEDN}$ at the common terminal of transistor Q1 and the LED load, or voltage difference $V_{DS\_Q1}$ between the two terminals of transistor Q1.

As shown in FIG. 5, the magnitude of control signal $V_{COMPV}$ can increase when voltage difference $V_{DS\_Q1}$ is less than threshold voltage Vdsth, and decrease when voltage difference $V_{DS\_Q1}$ is greater than threshold voltage Vdsth, such that voltage VEC5 closely matches load voltage $V_{LED}$ in the steady state, thereby reducing the difference between voltage VEC5 and load voltage $V_{LED}$ and improving the efficiency of the LED driving circuit. For example, voltage difference $V_{DS\_Q1}$ may serve as voltage sampling signal Vs. However, voltage $V_{LEDN}$ can also serve as voltage sampling signal Vs. For example, the magnitude of control signal $V_{COMPV}$ can increase when voltage $V_{LEDN}$ is less than threshold voltage Vdsth, and decrease when voltage $V_{LEDN}$ is greater than threshold voltage Vdsth, such that voltage VEC5 closely matches load voltage $V_{LED}$ in the steady state, thereby reducing the difference between voltage VEC5 and load voltage $V_{LED}$ and improving the efficiency of the LED driving circuit.

Figure 6:
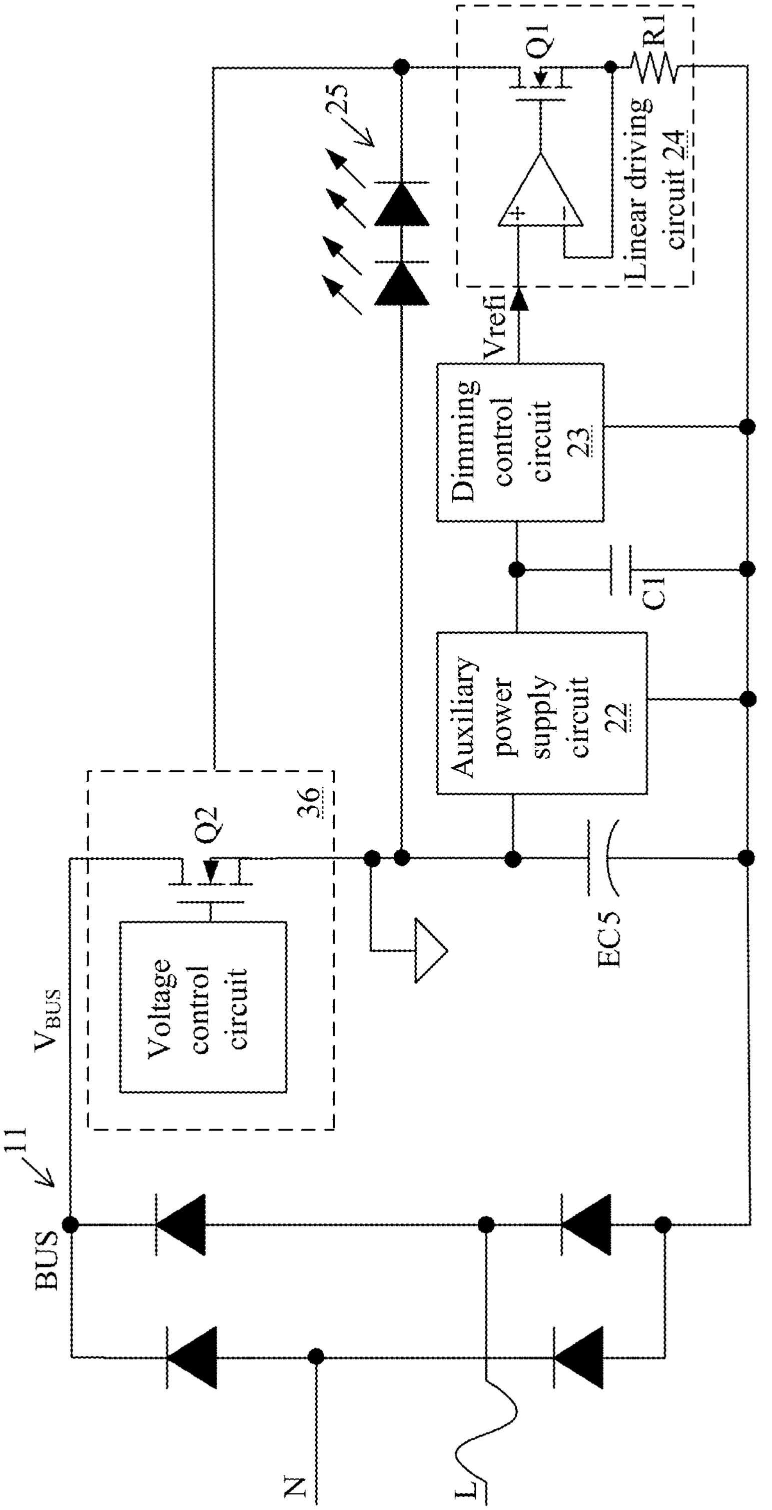
FIG. 6 is a schematic block diagram of a third example LED driving circuit, in accordance with embodiments of the present invention.

Referring now to FIG. 6, shown is a schematic block diagram of a third example LED driving circuit, in accordance with embodiments of the present invention. In this particular example electrolytic capacitor EC5 can connect to the second output of rectifier circuit 11, and voltage regulation circuit 36 can connect to the first output of rectifier circuit 11. Also, a common node of voltage regulation circuit 36 and electrolytic capacitor EC5 is the ground terminal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A light-emitting diode (LED) driving circuit, comprising:

a) an electrolytic capacitor coupled between two outputs of a rectifier circuit;

b) an auxiliary power supply circuit directly connected in parallel with two terminals of the electrolytic capacitor, and being configured to convert a voltage of the electrolytic capacitor into a power supply voltage to at least power a dimming control circuit, wherein the auxiliary power supply circuit is configured as a switch-mode power converter, and the dimming control circuit is configured to generate a dimming control signal; and c) a linear driving circuit configured to control a driving current flowing through an LED load based on the dimming control signal, wherein the linear driving circuit is coupled in series with the LED load, wherein a series connection of the linear driving circuit and the LED load is directly coupled in parallel with the electrolytic capacitor.

2. The LED driving circuit of claim 1, wherein a first terminal of the electrolytic capacitor is coupled to a first output of the rectifier circuit, and a second terminal of the electrolytic capacitor is coupled to a second output of the rectifier circuit and a ground terminal.

3. The LED driving circuit of claim 1, wherein two inputs of the switch-mode power converter are respectively coupled to two terminals of the electrolytic capacitor.

4. The LED driving circuit of claim 1, further comprising a voltage regulation circuit configured to control the voltage of the electrolytic capacitor, and to decrease a difference between the voltage of the electrolytic capacitor and a load voltage of the LED load.

5. The LED driving circuit of claim 4, wherein the voltage regulation circuit is configured to control the voltage of the electrolytic capacitor based on a voltage sampling signal indicating a difference between the voltage of the electrolytic capacitor and the load voltage of the LED load, such that the difference is decreased.

6. The LED driving circuit of claim 5, wherein:

a) the voltage regulation circuit is configured to compare the voltage sampling signal against a threshold voltage, and to control the voltage of the electrolytic capacitor; and b) when the voltage sampling signal is greater than the threshold voltage, the voltage regulation circuit is configured to decrease the voltage of the electrolytic capacitor.

7. The LED driving circuit of claim 5, wherein:

a) the voltage regulation circuit is configured to compare the voltage sampling signal against a threshold voltage, and to control the voltage of the electrolytic capacitor; and b) when the voltage sampling signal is less than the threshold voltage, the voltage regulation circuit is configured to increase the voltage of the electrolytic capacitor.

8. The LED driving circuit of claim 5, wherein the voltage regulation circuit comprises:

a) a first control signal generation circuit configured to receive the voltage sampling signal and a threshold voltage, in order to obtain a first control signal;

b) a voltage control circuit configured to receive the first control signal, and to control the voltage of the electrolytic capacitor based on the first control signal; and c) wherein the electrolytic capacitor is coupled in series with the voltage control circuit, or the electrolytic capacitor is coupled to an output of the voltage control circuit.

9. The LED driving circuit of claim 8, wherein a variation trend of the first control signal is opposite to a variation trend of the voltage sampling signal, and the variation trend of the first control signal is consistent with a variation trend of the voltage of the electrolytic capacitor.

10. The LED driving circuit of claim 8, wherein:

a) the voltage control circuit comprises a transistor that is coupled in series with the electrolytic capacitor; and b) the voltage control circuit is configured to control a charging current of the electrolytic capacitor by a current flowing through the transistor, in order to adjust the voltage of the electrolytic capacitor.

11. The LED driving circuit of claim 8, wherein:

a) the voltage control circuit comprises a transistor that is coupled in series with the electrolytic capacitor; and b) the voltage control circuit is configured to control a discharging current of the electrolytic capacitor by a current flowing through the transistor, in order to adjust the voltage of the electrolytic capacitor.

12. The LED driving circuit of claim 4, wherein the voltage regulation circuit is coupled in series with the electrolytic capacitor between the two outputs of the rectifier circuit.

13. The LED driving circuit of claim 12, wherein:

a) the electrolytic capacitor is coupled to a first output of the rectifier circuit, and the voltage regulation circuit is coupled to a second output of the rectifier circuit; and b) the second output of the rectifier circuit is a ground terminal.

14. The LED driving circuit of claim 12, wherein:

a) the electrolytic capacitor is coupled to a second output of the rectifier circuit, and the voltage regulation circuit is coupled to a first output of the rectifier circuit; and b) a common node of the voltage regulation circuit and the electrolytic capacitor is a ground terminal.

* * * * *